United States Patent [19]

Nakaguchi

[11] 3,884,647

[45] May 20, 1975

[54] DETERGENT AUTOMOTIVE FUEL COMPOSITION

[75] Inventor: Glenn M. Nakaguchi, Irvine, Calif.

[73] Assignee: Union Oil Company of California, Los Angeles, Calif.

[22] Filed: Aug. 9, 1973

[21] Appl. No.: 387,207

[52] U.S. Cl. .................................................... 44/72
[51] Int. Cl. .............................................. C10l 1/26
[58] Field of Search ...................... 44/72, DIG. 1, 58

[56] References Cited
UNITED STATES PATENTS

| | | | |
|---|---|---|---|
| 2,902,354 | 9/1959 | Giammaria | 44/72 X |
| 3,438,757 | 4/1969 | Honnen et al. | 44/72 X |
| 3,527,804 | 9/1970 | Cyba | 44/72 X |

*Primary Examiner*—W. Cannon
*Attorney, Agent, or Firm*—Lannas S. Henderson; Richard C. Hartman; Dean Sandford

[57] ABSTRACT

Certain N-long-branched-chain alkyl, N-hydroxyalkyl alkylene polyamines, when added to automotive hydrocarbon fuels in very small proportions, are found to provide remarkably effective detergents for removing and preventing the formation of gums and other deposits in fuel induction systems. These additives are also found to exhibit a substantially lesser tendency to emulsify water in the fuel than other presumably analogous compositions.

10 Claims, No Drawings

DETERGENT AUTOMOTIVE FUEL COMPOSITION

BACKGROUND AND SUMMARY OF INVENTION

A great variety of chemical additives have previously been proposed for use as detergents and/or dispersants in gasolines, for the primary purpose of removing and/or preventing the formation of deposits of dirt, gum, lacquer, and the like in the induction system of internal combustions engines, primarily on the internal surfaces of the carburetor throat and associated parts. The formation of these carburetor deposits is not only an annoyance from the standpoint of engine performance, but has in recent years become a significant factor in contributing to atmospheric pollutants, by virtue of incomplete fuel combustion resulting from maladjustments in air/fuel ratios which such deposits bring about.

One of the most widely used classes of detergent fuel additives consists of oil-soluble aliphatic hydrocarbyl amines and polyamines. A significant recent development in this area is represented by U.S. Pat. No. 3,438,757, which principally discloses additives comprising aliphatic hydrocarbyl amines or polyamines wherein the molecular weight of the hydrocarbyl radical is from about 400 to 5,000. These additives are effective carburetor detergents, but many of them have been found to be objectionable in that they have a strong tendency to emulsify water into the fuel. Problems resulting from water emulsification arise mainly from condensation of water vapor in gasoline storage tanks. The emulsified water tends to disturb air/fuel ratios in the carburetor, and can carry with it particles of hydrophilic dirt, rust and other debri, resulting in clogging of fuel filters and other problems in engine performance and maintenance. The N-hydroxyalkyl polyamine additives of this invention are found to be equal or superior in detergency to the hydrocarbyl amines of the above noted patent, and at the same time are found to exhibit a substantially lesser tendency to emulsify water than the latter.

Also disclosed in said U.S. Pat. No. 3,438,757 is a class of N-hydroxyalkyl monoamines wherein the amino nitrogen atom is again bonded to a high molecular weight aliphatic hydrocarbyl radical. These compositions however have been found to be substantially inferior in detergency as compared to the hydroxyalkyl polyamines of this invention. In a competitive economy, one primary requirement for a detergent additive is that it be effective in relatively low concentrations. I have found in general that the hydroxyalkyl polyamines of this invention need be used at dosage levels only about one-half to one-fifth the levels required to achieve the same detergency rating in using the hydroxyalkyl monoamines of said patent. Effective dosage levels for the detergents of this invention range between about 4 and 25 pounds per thousand barrels of gasoline, and little benefit is gained by using larger amounts.

The additives of this invention may be characterized generically as N-aliphatic hydrocarbyl, N-hydroxyalkyl alkylene polyamines, wherein (1) the aliphatic hydrocarbyl radicals are essentially saturated, branched in structure and have a molecular weight between about 400 and 4,000, preferably 550–2,000, (2) the hydroxyalkyl radicals have from 2 to about 6 carbon atoms each, and (3) the alkylene polyamine has from 2 to about 6 amine groups linked together through alkylene groups having from 2 to about 6 carbon atoms. They are in general complex mixtures prepared by the reaction of about one mole ratio of a halogenated, branched chain polyolefin having a molecular weight between about 400 and 4000 and an average of about 1–6 halogen atoms per molecule with 1–25 mole-ratios of an N-hydroxyalkyl alkylene polyamine of the formula:

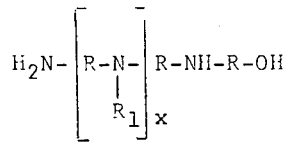

wherein each R represents an alkylene group of 2–6 carbon atoms, $R_1$ is hydrogen or R—OH, not more than one $R_1$ being R—OH, and $x$ is a number from 0 to 4, the reaction being carried out under time-temperature conditions sufficient to displace at least about 60 percent, and preferably at least about 75 percent, of the halogen in said halogenated polyolefin with radicals of said N-hydroxyalkyl alkylene polyamine. Following the reaction, excess unreacted N-hydroxyalkyl alkylene polyamine and displaced hydrogen halide are removed from the mixture. The resulting products contain in general about 0.5 – 5 weight-percent nitrogen and 0.2 – 4 weight-percent of oxygen.

DETAILED DESCRIPTION

Exemplary N-hydroxyalkyl polyamine reactants for use herein include the following, preferred members being designated (P):

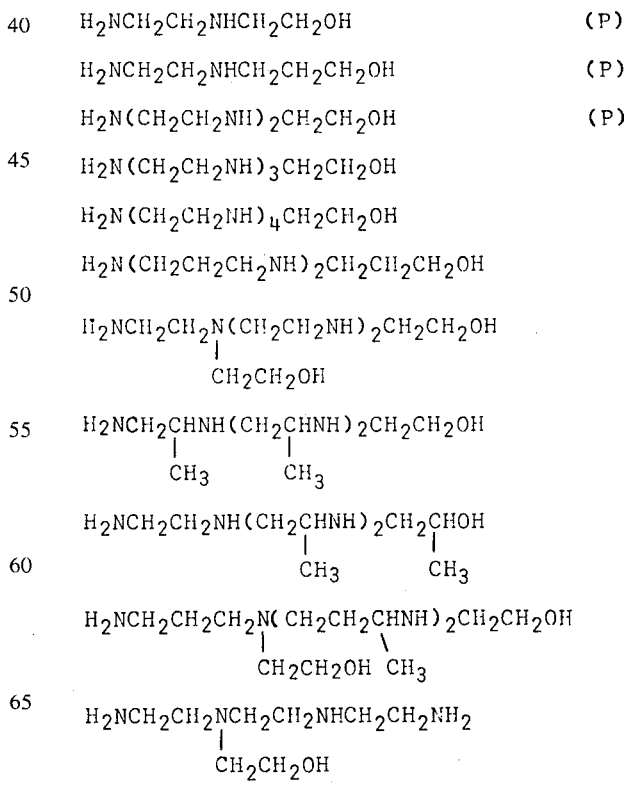

A preferred subclass of hydroxyalkyl polyamines comprises the secondary-N-mono(hydroxyalkyl)alkylene polyamines wherein the hydroxyalkyl radical has from 2 to about 6 carbon atoms (preferably 2 to 4), and wherein the alkylene polyamine has from 2 to about 6 (preferably 2-4) amine groups linked together through alkylene groups having from 2 to about 6 carbon atoms (preferably 2), at least one of the amine groups being primary. From the standpoint of ready availability and cost, the preferred amines are the secondary-N-hydroxyethyl or secondary-N-hydroxypropyl derivatives of ethylenediamine, diethylenetriamine, triethylenetetramine or tetraethylenepentamine. Obviously, mixtures of the foregoing and other N-hydroxyalkyl alkylene polyamines may also be used.

The long chain N-aliphatic hydrocarbyl radicals in the final detergent composition are preferably derived from branched chain polymers and copolymers of olefins having from 2 to 6 carbon atoms. When ethylene is employed it is copolymerized with another olefin such as propylene or isobutylene in order to provide a branched chain. For adequate solubility in hydrocarbons, the polyolefin should have at least one branch on the average for each six carbon atoms of the chain, and preferably at least one, and still more preferably two, branches on the average per four carbon atoms of the chain. Normally the branching is in the form of methyl or ethyl side chains. The preferred polyolefins are polyisobutylene, polypropylene, and copolymers thereof.

The preferred method for introducing the polyolefin into the polyamine molecule as an N-hydrocarbyl radical involves first halogenating, preferably chlorinating, the polyolefin, and then reacting the resulting halohydrocarbon with the desired N-hydroxyalkyl polyamine with resultant elimination of hydrogen halide. Methods for the halogenation of polyolefins are well known in the art, some being described in the above noted U.S. Pat. No. 3,438,757. Free radical catalysts normally are used such as peroxides, azo compounds and the like. The halogen is believed to enter the hydrocarbon molecule mainly on tertiary carbon atoms and/or at sites of olefinic unsaturation. The amount of halogen introduced will depend primarily on the molecular weight of the hydrocarbon used, and the particular N-hydroxyalkyl polyamine to be used. Generally it is desirable to introduce an average of about 1 to 6, preferably 1 to 4, halogen atoms per molecule. On a weight basis this will generally range between about 1 and 20, and usually about 2 to 10 percent.

The N-hydroxyalkyl polyamine and the halohydrocarbon are reacted together in the presence or absence of an inert solvent, at temperatures between about 30° and 250°C, preferably about 90° - 240°C. The reaction time will of course depend upon the temperature, the mole-ratios of the reactants and their concentrations (if a solvent is employed). Ordinarily the reaction is suitably complete within 1-24 hours, usually between about 2-10 hours. Most of the liberated hydrogen halide remains in the reaction mixture in salt form with the amine groups, and is subsequently removed by caustic washing.

It is preferred that the final composition contain an average of about 1-4 moles of N-aliphatic hydrocarbyl radicals per mole of N-hydroxyalkyl alkylene polyamine, and preferably about 1-3 moles. In order to suppress further poly-substitution of hydrocarbyl radicals on the polyamine, it is preferred to employ a mole excess of the latter. Generally about 1-25, and preferably about 2-15 moles of the polyamine are employed per mole of the halohydrocarbon.

It is difficult to displace all of the halogen from the halohydrocarbon, but the reaction is generally found to be sufficiently complete when at least 60 percent, and preferably at least about 75 percent of the halogen has been displaced. After suitable completion of the reaction, the product is cooled and washed with aqueous caustic solution, and then with water. During these washings it may be desirable to add hydrocarbons such as toluene to suppress water solubility of the additive, and minor amounts of emulsion breakers such as N-butyl alcohol or isopropyl alcohol. The excess of unreacted N-hydroxyalkyl polyamine may require two or three successive water washings for complete removal, even though these materials are very water soluble.

The products prepared as above described are found by analysis to contain all three types of amine groups, primary, secondary and tertiary, and infrared analysis shows the presence of hydroxyl groups and the absence of ether linkages. It is therefore apparent that the reaction must involve interaction between both primary and secondary amine groups with the halogenated sites of the halohydrocarbon. Some dehydrohalogenation of the halohydrocarbon may also occur during the reaction, with the result that there may be an average of one or two olefinic linkages in the hydrocarbyl radicals. This unsaturation is not deleterious and in view of their high molecular weight, such hydrocarbyl radicals may still be characterized as being essentially saturated.

The finished detergent additive is generally employed in the form of a concentrate, using a suitable hydrocarbon and/or alcohol solvent boiling in the range of about 100° - 400°F. Preferred solvents are aromatic hydrocarbons such as benzene, toluene, xylene or the like, or aliphatic alcohols of about 3-10 carbon atoms such as isopropanol, butanol and the like, or mixtures thereof. The concentration of additive in the solvent will ordinarily be at least about 20 percent by weight but generally not more than about 80 percent.

Operative concentrations of the additive in the final gasoline composition range (on a solvent free basis) between about 4 and 50, and preferably between about 5 and 25 pounds per thousand barrels.

The final gasoline composition, and/or the additive concentrate, may also include other conventional gasoline additives such as lead alkyls, alkyl halide lead scavengers, etc. Also, for maintaining maximum intake valve cleanliness, a medium or heavy paraffinic lubricating oil of low wax content may also be included in amounts between about 50 and 450 pounds per thousand barrels of gasoline. Preferred lubricating oils comprise solvent dewaxed, distillate oils having a viscosity at 100°F of 200 to 1000 SSU, a viscosity index above 70, and an API gravity of about 25 to 32.

The following examples are cited to illustrate the invention, but are not to be construed as limiting in scope.

EXAMPLE I

Preparation of Polyisobutenyl Chloride

A 5 liter, 3-neck flask was fitted with a gas dispersion tube, stirrer and reflux condenser. The flask was charged with 1,500 g (1.5 moles) of polyisobutylene (average molecular weight of 940) and 1,500 g of carbon tetrachloride solvent. The flask and contents were cooled in an ice bath. About 228 g of chlorine was bubbled through the reaction mixture at a rate of about 300 ml/min for a total of 227 minutes. The carbon tetrachloride solvent was removed under vacuum to yield 1,600 g polyisobutenyl chloride which contained 6.78 weight-percent Cl.

EXAMPLE II

Preparation of Additive "A"

A 5 liter reaction flask was fitted with a thermometer, addition funnel, stirrer and condensate trap. The flask was charged with 1,200 grams (2.3 moles Cl) of the polyisobutenyl chloride from Example I, 955 g (9.2 moles) of N-(2-hydroxyethyl) ethylenediamine, and 1200 g of benzene solvent. The mixture was heated at 170°C for 3½ hours, and during the heating most of the benzene solvent was removed from the reaction mixture. Upon cooling to 125°C, 1400 ml of toluene was added to the flask. The toluene solution was washed twice with 1,000 ml water, once with 1,000 ml 10% NaOH, 5 times with 25% isopropyl alcohol, and 3 times again with water. About 50 ml of n-butyl alcohol and 100 ml of isopropyl alcohol were used to break emulsions in the final two water washes. The toluene solvent was removed by vacuum distillation to yield 1,213 g of solvent-free product. Analysis: weight-percent N, 2.0; weight-percent Cl, 1.0. This nitrogen content indicates that the product contained an average of about 1.5 polyisobutenyl radicals per molecule of the N-hydroxyalkyl alkylene polyamine.

EXAMPLE III

Preparation of Additive "B"

The procedure of Example II was essentially repeated, substituting for the hydroxyethyl amine reactant a mole-equivalent proportion of N-(3-hydroxypropyl) ethylenediamine. The resulting product had essentially the same nitrogen and chloride content as did additive A, and was hence approximately the same relative molar composition.

EXAMPLE IV

Preparation of Additive "C"

The procedure of Example II was essentially repeated, using as the N-hydroxyalkyl amine a mole-equivalent proportion of ethanolamine. The resulting product analyzed 1.4 weight-percent N and 1.2 weight-percent Cl, and was thus composed on the average of about 1.3 moles of polyisobutenyl radicals per mole of ethanolamine.

EXAMPLE V

Preparation of Additive "D"

The procedure of Example II was essentially repeated, using in place of N-hydroxyalkyl diamine a mole-equivalent proportion of diethylenetriamine. On the basis of nitrogen content of the resulting product, its average composition was apparently about 1.5 moles of polyisobutenyl radicals per mole of diethylenetriamine.

EXAMPLE VI

Carburetor Detergency Testing

Each of the foregoing additives A, B, C and D (along with a commercial additive "E" later herein identified) were compared at various dosages for their effectiveness in maintaining carburetor cleanliness. The detergency test procedure was as follows:

Two six cylinder Chevrolet engines were used, one producing controlled blowby gases which were fed to the carburetor of the second or test engine. The carburetor of the test engine was equipped with an initially clean, glass throttle body insert, making it possible to monitor visually the accumulation of deposits in the throttle bore area during the tests. The test procedure was to run the test engine at idle and zero load for 90 minutes with a short 0.6 second acceleration burst every 15 minutes. During the acceleration burst liquid gasoline washes down the sides of the throttle body. When there is no detergent additive present in the gasoline this washing action has no effect on deposits which have accumulated on the walls around the throttle plate. When a detergent additive is present in the gasoline some of the accumulated deposits are washed away. At the completion of each test, the glass insert was removed and visually compared with a standardized series of photographs of the glass insert dirtied to varying degrees. A rating of zero indicates that the glass is completely black and a rating of 10 means that it is perfectly clean. This evaluation of relative cleanliness has been found to be reproducible within about ±0.25. The results of the test runs were as follows:

Table 1

| Additive | Amine Component | Dosage Lbs/M Bbl | Detergency Rating |
| --- | --- | --- | --- |
| A | N-(hydroxyethyl) ethylenediamine | 10 | 9.1 (8 run av.) |
|  |  | 15 | 9.25 (4 run av.) |
|  |  | 30 | 9.25 |
| B | N-(hydroxypropyl) ethylenediamine | 50 | 9.5 |
| C | Ethanolamine | 15 | 8.75 |
|  |  | 20 | 8.75 |
|  |  | 25 | 8.75 (2 run av.) |
|  |  | 50 | 9.25 |
| D | Diethylenetriamine | 15 | 9.0 |
| E[1] | Ethylenediamine | 15 | 9.0 |
|  |  | 17.5 | 9.25 |
|  |  | 35 | 9.25 – 9.5 |
|  |  | 121 | 9.25 – 9.5 |
| None-Base Gasoline |  | — | 6.5 – 6.75 |

[1]This commercial additive appears to be composed of about 2–3 moles of polyisobutenyl radicals of about 1000 M.W. per mole of ethylenediamine.

From the foregoing it will be seen that:

1. The additives A and B of this invention are about three times as effective as prior art analog additive C; a concentration of only 15 pounds per thousand barrels of additive A was required for a 9.25 rating, while for additive C a concentration of 50 pounds was required for this rating.

2. Additives A and B are at least equal in detergency to prior art additives D and E. The latter however, are inferior in their water emulsification propensities.

EXAMPLE VII

Carburetor Cleanup Testing

Additives A, C and E above were further tested for their ability to effect cleanup of previously dirtied carburetor throttle bodies. In this test, the same two six cylinder Chevrolet engines were employed as were employed for the keep-clean test procedure. For cleanup tests the glass throttle body insert is first dirtied by running the test engine (with blowby from the first engine) on base gasoline (no additive) at idle and zero load for 90 minutes to give a standard dirty rating of 6½ – 6¾. The blowby feed is then disconnected from the test engine carburetor and the test engine is run at idle and zero load using the test gasoline. The engine is given a short acceleration burst every 3 minutes. The test is run for 5 hours, and the glass throttle body is rated for cleanliness at the end of 2 hours and 5 hours. The rating is on the same scale of zero to 10 as described above, zero meaning completely black and 10 meaning perfectly clean. The results of the tests were as follows:

Table 2

| Additive | Amine Component | Dosage, Lbs/M Bbl | Cleanliness Rating at: | | |
|---|---|---|---|---|---|
| | | | Base, 0-Hour | 2 Hour | 5 Hour |
| A | N-(hydroxyethyl) ethylenediamine | 15 | 6.5 | 7.5[1] | 8.13[1] |
| C | Ethanolamine | 15 | 6.75 | 7.75 | 7.75 |
| E | Ethylenediamine | 15 | 6.5 | 7.0 | 7.75 |

[1] Average of two runs.

It will thus be seen that additive A of the present invention is significantly superior in cleanup activity to either of the prior art analogs C and E.

EXAMPLE VIII

Water Emulsibility Test

Each of additives A, D and E above were evaluated for their tendency to emulsify and suspend water in gasoline. In this test, 610 ml of gasoline and 6 ml of water are subjected to violent agitation for 10 minutes with a propeller type stirrer at 5400 rpm. The stirring is then stopped, and the mixture is allowed to settle for 30 seconds, after which the upper 75 percent of the liquid is siphoned off into a settling vessel, and the minutes required for the initially opaque mixture to reach a light haze and a perfectly clear state are measured. The light haze point is defined as the time when two closely spaced parallel red lines on a white card observed horizontally through the fuel can first be resolved as two separate lines. The clear point is the time at which the fuel first reaches a bright and clear condition by observation vertically down through the vessel. The results of these tests were as follows:

Table 3

| Additive | Amine Component | Dosage, Lbs/M Bbl | Minutes To: | |
|---|---|---|---|---|
| | | | Light Haze | Clear |
| A | N-(hydroxyethyl) ethylenediamine | 15 | 90 | 220 |
| D | Diethylenetriamine | 15 | 210 | 355 |
| E | Ethylenediamine | 15 | 180 | 340 |

It is thus apparent that additive A of the present invention exhibits a substantially lesser tendency to retain water in emulsified suspension than do either of the prior art additives D and E.

Other additives within the purview of this invention exhibit similar superior detergency and/or water emulsibility tendencies as compared to the types of high molecular weight prior art analogs tested above. The following claims and their obvious equivalents are intended to define the true scope of the invention:

I claim:
1. A fuel composition comprising a major proportion of a liquid hydrocarbon fuel and dissolved therein an effective detergent proportion of an additive comprising a mixture of N-aliphatic hydrocarbyl, N-hydroxyalkyl alkylene polyamines, the aliphatic hydrocarbyl radicals thereof being essentially saturated and having a branched chain structure and a molecular weight between about 400 and 4,000, the hydroxyalkyl radicals thereof having from 2 to about 6 carbon atoms, and said alkylene polyamine having from 2 to about 6 amine groups linked together through alkylene groups having from 2 to about 6 carbon atoms, a substantial portion of the amine groups in said additive being —NH$_2$ groups.

2. A composition as defined in claim 1 wherein said additive comprises between about 1–4 moles of N-aliphatic hydrocarbyl radicals and about 1–2 moles of N-hydroxyalkyl radicals per mole of said alkylene polyamine.

3. A composition as defined in claim 2 wherein:
   1. said alkylene polyamine is ethylenediamine, diethylenetriamine, triethylenetetramine, or tetraethylenepentamine;
   2. said aliphatic hydrocarbyl radical is polyisobutenyl; and
   3. said hydrocarbon fuel is gasoline and a proportion of said additive therein is between about 4 and 50 pounds per thousand barrels of gasoline.

4. A composition as defined in claim 1 wherein said alkylene polyamine is ethylenediamine, diethylenetriamine, triethylenetetramine, or tetraethylenepentamine.

5. A composition as defined in claim 1 wherein said aliphatic hydrocarbyl radical is a polyolefinyl radical having an average of at least one branch per 6 carbon atoms of chain length.

6. A composition as defined in claim 1 wherein said aliphatic hydrocarbyl radical is polyisobutenyl.

7. A composition as defined in claim 1 wherein said hydrocarbon fuel is gasoline and the proportion of said additive therein is between about 4 and 50 pounds per thousand barrels of gasoline.

8. A fuel composition comprising a major proportion of gasoline boiling range hydrocarbons, and dissolved therein between about 5 and 25 pounds per thousand barrels of a detergent additive consisting essentially of one or more N-polyisobutenyl, N-hydroxyalkyl ethylene polyamines, said polyisobutenyl radical having a molecular weight between about 550 and 2,000, said hydroxyalkyl radical having between 2 and 4 carbon atoms, and said ethylene polyamine having between 2 and 4 amine groups linked together through —CH$_2$CH$_2$— groups, a substantial portion of the amine groups in said additive being —NH$_2$ groups.

9. A composition as defined in claim 8 wherein said additive comprises about 1–3 moles of polyisobutenyl radicals and about 1 mole of hydroxyalkyl radicals per mole of said ethylene polyamine.

10. A composition as defined in claim 9 wherein said ethylene polyamine is ethylenediamine.

* * * * *